No. 866,455. PATENTED SEPT. 17, 1907.
J. T. GANTT.
FERTILIZER DISTRIBUTER.
APPLICATION FILED JUNE 26, 1907.
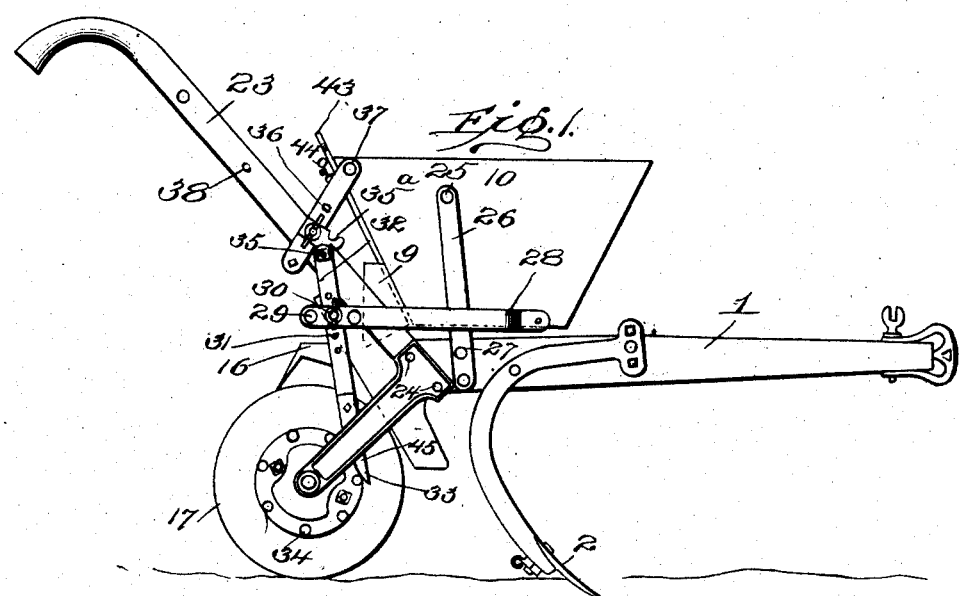
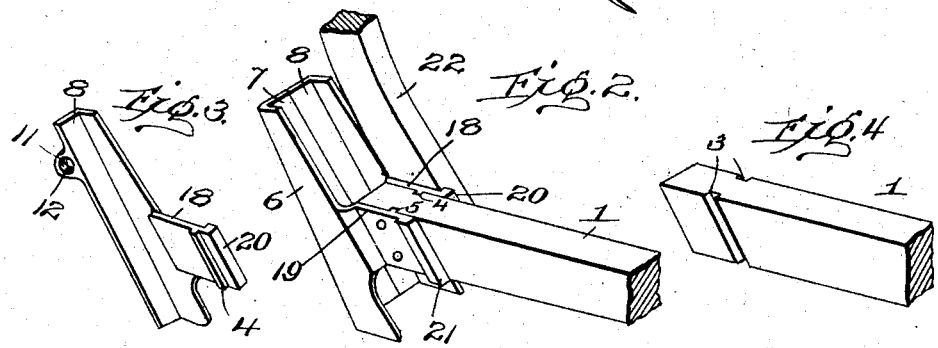
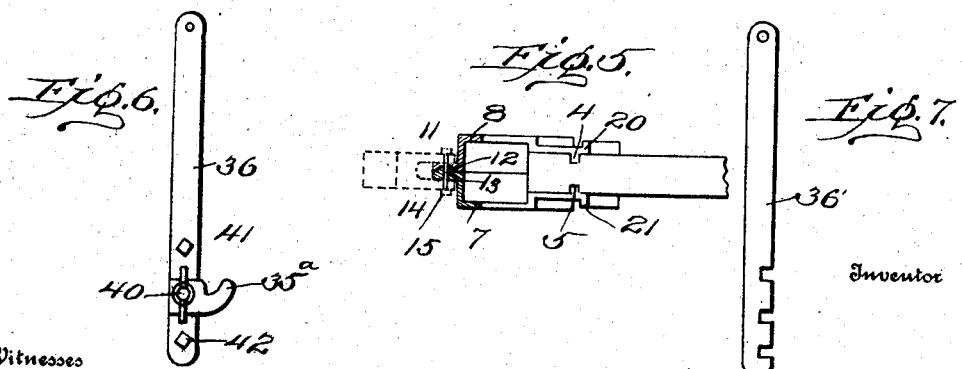

UNITED STATES PATENT OFFICE.

JAMES T. GANTT, OF MACON, GEORGIA.

FERTILIZER-DISTRIBUTER.

No. 866,455.  Specification of Letters Patent.  Patented Sept. 17, 1907.

Application filed June 26, 1907. Serial No. 380,967.

*To all whom it may concern:*

Be it known that I, JAMES T. GANTT, a citizen of the United States, residing at Macon, in the county of Bibb and State of Georgia, have invented certain new and useful Improvements in Fertilizer-Distributers; and I do hereby declare the following to be a full, clear, and exact description of the invention, such as will enable others skilled in the art to which it appertains to make and use the same.

This invention relates to improvements in fertilizer distributers, and more particularly to distributers provided with a plow and means for distributing fertilizer in the rear thereof.

The invention comprises the production of a distributer formed with an oscillating hopper, means for oscillating the hopper and means for varying the degree of oscillation for varying the quantity of fertilizer distributed.

The invention further comprises the production of a pivotally mounted hopper, a reciprocating arm secured to the hopper, a swinging arm secured to the reciprocating arm for moving the same, and a tappet wheel for moving said swinging arm.

The invention still further comprises a wheel provided with tappets and means in connection therewith for oscillating or jarring the hopper, a chute for feeding or conveying the fertilizer from the hopper to the earth, and means for throwing out of operation the said hopper.

The object in view is the production of a fertilizer distributer in which the hopper may be jarred or oscillated for distributing fertilizer, and a swinging arm designed to contact with a tappet wheel for oscillating the hopper.

Another object in view is the production of a chute for receiving fertilizer from the hopper, provided with means for accommodating a scraper.

With these and other objects in view, the invention comprises other construction, combinations and arrangements of parts as will hereafter be more fully described and claimed.

In the accompanying drawings:—Figure 1 is a side elevation of a fertilizer distributer formed according to the present invention. Fig. 2 is a detailed perspective view of a chute and surrounding parts forming a part of the present invention. Fig. 3 is a perspective view of one-half of the chute disclosed in Fig. 2. Fig. 4 is a detailed fragmentary perspective view of a part of the plow beam. Fig. 5 is a horizontal section through the upper part of the chute seen in Fig. 2. Fig. 6 is an enlarged plan view of a catch forming part of the present invention. Fig. 7 is a slightly modified form of the catch seen in Fig. 6.

In constructing a fertilizer distributer according to the present invention I provide a plow beam 1 of any preferred or usual construction, having secured thereto a plow 2 of any desired construction. Near the rear end of beam 1 are grooves at 3 for engaging lugs or ridges 4 and 5 of chute 6. Chute 6 is preferably made in two parts, as 7 and 8, and is designed to extend any desired distance upward, as seen in Fig. 1, to receive fertilizer from another chute 9 secured to hopper 10. Chute 6 also may extend to any desired distance downward for guiding fertilizer to the furrow in the rear of plow 2. Formed on the rear of part 8 of chute 6 is a lug 11 formed with a concave portion 12, and formed on the rear of part 7 of chute 6 is a lug 13, formed with a conical shaped portion 14 for engaging the depressed portion 12. A suitable securing means as bolt 15 is designed to pass through lugs 11 and 13 for holding the same together, consequently for holding the rear of chute 6 together. Bolt 15 is also designed to sustain in position a scraper 16. Formed on chute 6 are forwardly projecting members 18 and 19 which have formed on the surfaces thereof lugs or ridges 4 and 5, as heretofore described, for engaging grooves or ways 3 in beam 1. By this structure side plates and engaging grooves or ways 3 are provided that form means for rigidly holding a chute in position, and also form a rigid support for the guiding handles 22 and 23. The lugs or ridges 4 and 5 by engaging the groove 3 materially assist bolts 24 at all times in firmly holding the chute 6 and mechanism connected thereto in position. The outer ends of members 18 and 19 are formed with lugs or ridges 20 and 21. Between lug 20 and the main body 8 of the chute is positioned a handle 22 and between lug 21 and the main body of portion 7 of the chute is positioned another handle 23 of any desired construction. Members 7 and 8 and lugs 20 and 21 form ways in which handles 22 and 23 are adapted to fit and are firmly held in position by suitable bolts 24. When bolts 24 are tightened not only handles 22 and 23 are held in position, but also members 18 and 19 upon beam 1 and consequently chute 6 is also held in correct relation to beam 1 and hopper 10. I have described chute 6 as being made in two parts, but it will be evident that the same may be made in one piece and lugs 11 and 13 made integral. This will accomplish the same results as when made in two parts, but preferably I make the same in two parts, as it is usually easier to cast the members 7 and 8 independently.

Hopper 10 is pivotally mounted at 25 upon a member 26, as clearly seen in Fig. 1. Member 26 is rigidly secured to beam 1 at 27. I preferably position a member as 26 on each side of beam 1 so as to form two pivots for hopper 10 and give the same an easier movement. Pivotally mounted near the base of hopper 10 is a reciprocating arm 28 which has formed therein any desired number of apertures 29 to which a suitable securing member as a thumb screw or bolt 30 is designed to pass. Thumb screw or bolt 30 is also designed to pass through apertures 31 formed in a pivotally mounted arm 32. Apertures 31 may be of any desired number, as well as apertures 29, so that arm 28 may be adjusted in a vertical or horizontal plane, as may be desired for regulating the position of the hopper 10 for regulating the feed of the fertilizer according to the nature of the same, that is, whether or not the fertilizer is in a dry or damp state. When the fertilizer is dry the members 28 and 32 are so regulated as to only slightly jar the hopper 10 while when the fertilizer is in a damp condition the arms 28 and 32 are so adjusted as to jar or shake considerably hopper 10 and also to so regulate hopper 10 as to cause the same to be positioned at an angle to the horizontal plane for more easily feeding the fertilizer to chute 9. Arm 32 is preferably pivotally mounted at 35 on handle 23 and usually the pivotal member or bolt projects outward a short distance and affords a pin or member which is designed to engage a hook 35ª positioned on a pivotally mounted arm 36 which is designed to hold member 33 out of engagement with pins 34 when in engagement with pivotal bolt 35. Arm 36 is pivotally mounted at 37 on hopper 10 so that whenever the same is brought over into engagement with bolt 35 or with another projection as 38, positioned on handle 23, it will draw or rock hopper 10 so as to force forward arm 28 and consequently lift member 33 off of pins or tappets 34. When this is done the revolving of wheel 17 and tappets 34 will not jar or rock hopper 10 and consequently no fertilizer will be distributed therefrom. As clearly seen in Fig. 6, arm 36 is provided with a hook 35ª which is held in place by a suitable bolt or thumb screw 40 and which is designed to be removed so that hook 35ª may be held opposite aperture 41 or 42 for varying the length of arm 36.

Positioned in the rear of hopper 10 is a door or slide 43 which is designed to be held in any desired position by a set screw 44. Slide 43 is adapted to close an opening formed in the rear of hopper 10 or for partially closing same for regulating the amount of fertilizer that is permitted to escape through chute 9 and chute 6 to the earth.

In operation, as the distributer is drawn across the field, plow 2 makes a furrow in the usual manner and wheel 17 rotates, together with tappets or pins 34 for striking or jarring member 33. As one of the pins 34 engages member 33 it will force the same forward and member 33 acting through arm 32 will force arm 28 forward and consequently rock forwardly hopper 10. After the pin has passed the lower point of member 33 said member will fall by gravity against the next succeeding pin and also be assisted in its fall by the weight of fertilizer in hopper 10. When it strikes the next succeeding pin it will, as will be evident, jar hopper 10 by the sudden stopping of the swinging movement thereof. This will cause to be fed out through chute 9 fertilizer that is designed to be distributed. If slide 43 is sufficiently raised to leave uncovered the opening formed in the rear of hopper 10 a considerable amount of fertilizer will be jarred into chute 6 and to the earth, but if slide 43 is partially closed only a small amount of fertilizer will be jarred out. In this way the amount of fertilizer distributed may be easily regulated. The amount of jarring also may be regulated by changing the position of pin 30 either upon arm 28 or arm 32 or on both, so as to give the hopper 10 a greater swinging movement between the time when the pins or tappets 34 engage member 33. It will be observed that member 33 is curved or arc-shaped at 45 and is designed to pass below or beyond any of the pins or tappets 34 against which the same rest. This construction is provided so that the distributer may be drawn forward or forced backward without in the least changing the mechanism or without injuring any of the parts or without locking wheel 17. I regard this as an important feature of my invention as it is very convenient and does not require the least attention for operating the distributer in any desired manner.

Another important feature of the invention is the reciprocating arm 28 together with arm or member 32. It will be observed that arm 32 is pivotally mounted and hangs in an almost vertical plane, while reciprocating member 28 is positioned in a horizontal plane. Arm 28, as well as arm 32, is positioned so as not to come in contact easily with stones, brush and the like, during the operation of the device, as the same are positioned a considerable distance above the ground. As clearly seen in Fig. 1, the reciprocating arm 28 is positioned above the plane of the beam 1 and consequently will not be in any danger of striking stones or other obstructions, while arm 32 is so positioned as to be a considerable distance above the earth and consequently not easily contact with any obstructions, for interfering with the operation of the same. By the particular construction and arrangement of parts in the present invention, all of the operating mechanism is positioned a considerable distance above the ground so as to be free from obstructions, and consequently to always be in condition for operating in the way desired.

What I claim is:—

1. A device of the character described, comprising a beam, a hopper pivotally mounted thereon, means for jarring said hopper for feeding fertilizer to the earth, and a catch pivotally secured to said hopper for holding said hopper out of operation, said catch comprising a swinging arm, an adjustable hook and means for securing said hook to said arm.

2. A device of the character described, comprising a beam, a hopper mounted thereon, an arm secured to said hopper, a pivotally mounted bar for moving said arm, means for adjustably securing said arm to said bar, a curved striking member secured to said bar, and means for striking said striking member for moving the same for jarring said hopper.

3. A device of the character described comprising a beam, a hopper pivotally mounted thereon, an arm pivotally secured to said hopper, a rocking arm adjustably secured to said pivotally mounted arm, a curved striking member secured to said rocking arm, and means for striking said striking member for moving same for jarring said hopper.

4. A device of the class described, comprising a beam formed with grooves near one end thereof, a hopper secured to said beam, and a chute for guiding the fertilizer from said hopper to the earth, said chute having formed thereon forwardly extending members formed with ridges for engaging the grooves in said beam for preventing movement of said chute.

5. A device of the character described, comprising a beam, a pivotally mounted hopper, means for jarring said hopper, a chute secured to said beam, means for holding said chute in position, and means for pivotally mounting a scraper on said chute.

6. A device of the character described, comprising a beam formed with grooves near one end thereof, a pivotally mounted hopper positioned above said beam, means for oscillating said hopper, a chute formed with lugs engaging said beam for holding the chute in position, means passing through said lugs and said beam for assisting in holding said chute in position.

7. A device of the character described, comprising a beam, a hopper secured to said beam, and a chute for guiding fertilizer from said hopper to the earth, said chute having formed thereon rearwardly-extending members for supporting a scraper, one of said rearwardly-extending members formed with a conical shaped depression and the other of said rearwardly-extending members formed with a conical shaped projection for engaging the depression in the corresponding rearwardly-extending member for holding the parts of said chute in proper position.

8. A device of the character described, comprising a beam, a plow and wheel secured thereto, a pivotally mounted hopper secured to said beam, projections secured to said wheel, means for causing said projections to jar said hopper, for feeding fertilizer therefrom, a chute for guiding said fertilizer to the earth, a scraper pivotally secured in the rear of said hopper, and means for throwing into and out of operation said hopper.

In testimony whereof I affix my signature in presence of two witnesses.

JAMES T. GANTT.

Witnesses:
JOHN L. FLETCHER,
A. L. KITCHIN.